United States Patent
Bloom et al.

(10) Patent No.: US 8,365,061 B1
(45) Date of Patent: Jan. 29, 2013

(54) CROSS-ORIGIN COMMUNICATION IN BROWSER FRAMES

(75) Inventors: David Bloom, Mountain View, CA (US); Joseph Schorr, New York, NY (US); Ben Lisbakken, San Francisco, CA (US); Jeffrey W Scudder, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/287,599

(22) Filed: Nov. 2, 2011

(51) Int. Cl.
*G06F 17/00* (2006.01)
(52) U.S. Cl. .......... 715/205; 715/234; 715/240
(58) Field of Classification Search .......... 715/240, 715/234, 205, 200, 255
See application file for complete search history.

(56) References Cited

U.S. PATENT DOCUMENTS

| | | | | |
|---|---|---|---|---|
| 8,108,771 | B2 * | 1/2012 | Chijiiwa et al. | 715/240 |
| 2005/0267799 | A1 * | 12/2005 | Chan et al. | 705/14 |
| 2006/0020506 | A1 * | 1/2006 | Axe et al. | 705/14 |
| 2007/0204223 | A1 * | 8/2007 | Bartels et al. | 715/540 |
| 2009/0099901 | A1 * | 4/2009 | Sah et al. | 705/10 |
| 2009/0299862 | A1 * | 12/2009 | Fan et al. | 705/14.73 |
| 2010/0017289 | A1 * | 1/2010 | Sah et al. | 705/14.49 |
| 2011/0055685 | A1 * | 3/2011 | Jaquish et al. | 715/234 |
| 2012/0016749 | A1 * | 1/2012 | Lisbakken | 705/14.71 |
| 2012/0054596 | A1 * | 3/2012 | Kroger et al. | 715/234 |

OTHER PUBLICATIONS

Wikipedia, "JSONP", http://en.wikipedia.org/wiki/JSONP, Oct. 30, 2011, 4 pages.
Mozilla Developer Network, "window.postMessage", https://developer.mozilla.org/en/DOM/window.postMessage Oct. 18, 2011, 7 pages.

* cited by examiner

*Primary Examiner* — Thu Huynh
(74) *Attorney, Agent, or Firm* — Harrity & Harrity, LLP

(57) ABSTRACT

A device may create a child frame within a container frame displayed by a browser program. The child frame may be associated with an origin that is different than an origin associated with the container frame. The device may determine whether the child frame is locked to prohibit reading of information relating to the child frame. The determination of whether the child frame is locked including checking whether a first variable is present in the child frame. The device may determine one or more values relating to the child frame, where the one or more values are determined by checking whether a second set of variables is present in the child frame, where each variable, in the second set, corresponds to a single bit of the one or more values.

28 Claims, 8 Drawing Sheets

CROSS-ORIGIN COMMUNICATION IN BROWSER FRAMES

BACKGROUND

Web pages, when displayed by a browser, may include content from a number of domains. An in-line frame (iFrame), for example, is one type of markup element that can be placed within a web page to display a hyper-text markup language (HTML) document that is received from a domain different than the main web page.

Communication between an iFrame, associated with one domain, and the main web page (e.g., a container frame), associated with a second domain, can be limited. In some browsers, messages, such as a "postMessage," can be used to exchange information across domains. Not all browsers, however, support such messages.

SUMMARY

A computer readable medium may contain instructions for execution by a browser program executed by one or more devices. The computer readable medium may include instructions to: create an iFrame within a second frame presented by the browser program, the iFrame being associated with an origin that is different than an origin associated with the container frame; determine whether the iFrame is locked to prohibit reading of information relating to the iFrame, the determination of whether the iFrame is locked including checking whether a first variable is set in the iFrame; determine, when the iFrame is determined to not be locked, where the one or more values are determined by checking whether a second set of variables is set in the iFrame, where each variable, in the second set, corresponds to a single bit of the one or more values; and control, based on the one or more values, a visual presentation of the container frame presented by the browser program.

In another possible implementation, a device-implemented method may include determining, by a first frame of a browser program being executed by the device, to communicate at least one value to a second frame, of the browser program being executed by the device. The method may further include setting, by the first frame of the browser program being executed by the device, a first variable to indicate that the at least one value is being set by the first frame. The method may further include setting or unsetting, by the first frame of the browser program being executed by the device, a second set of variables, where each variable, in the second set, corresponds to a single bit of the at least one value, and where a presence of a variable in the second set encodes one state of the single bit corresponding to the variable and where the absence of the variable in the second set encodes another state of the single bit corresponding to the variable. The method may further include unsetting, after setting or unsetting the second set of variables, by the first frame of the browser program, the first variable, to permit the one or more values to be communicated to the second frame.

In yet another possible implementation, a device-implemented method include receiving, by the device and from a client device, a request for a HTML document; and generating the HTML document to include programming instructions, that when executed by the client device, cause the client device to: set a first variable to indicate that at least one value is being set by a frame corresponding to the HTML document; set or unset a second set of variables, where each variable, in the second set, corresponds to a single bit of the at least one value, and where a presence of a variable in the second set encodes one state of the single bit corresponding to the variable and where the absence of the variable in the second set encodes another state of the single bit corresponding to the variable; and unset, after setting or unsetting the second set of variables, the first variable. The method may further include transmitting the generated HTML document to the client device.

In yet another possible implementation, a device may include a processor; and a memory to store programming instructions for execution by the processor, the programming instructions, when executed by the processor, cause the processor to: create an iFrame within a second frame presented by a browser program for display, the iFrame being associated with an origin that is different than an origin associated with the second frame, and the iFrame to communicate at least one value to the second frame. The programming instructions being additionally to set or unset, by the iFrame, a set of variables, where each variable, in the set, corresponds to a single bit of the at least one value, and where a presence of a variable in the set encodes a first state of the single bit corresponding to the variable and where the absence of the variable in the set encodes another state of the single bit corresponding to the variable. The programming instructions being additionally to determine, by the second frame, the at least one value communicated by the iFrame, where the at least one value is determined by checking whether the set of variables is present or absent in the iFrame; and control, based on the at least one value, a visual presentation of the container frame.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

A web page displayed by a browser may be constructed from multiple frames. For example, an iFrame may be included within a container frame. The iFrame may, for example, obtain and display advertisements from an advertisement server while the container frame may present the main content of the web page. At certain points, the iFrame may need to communicate information, such as a size of the iFrame, to the container frame.

Figure 1:
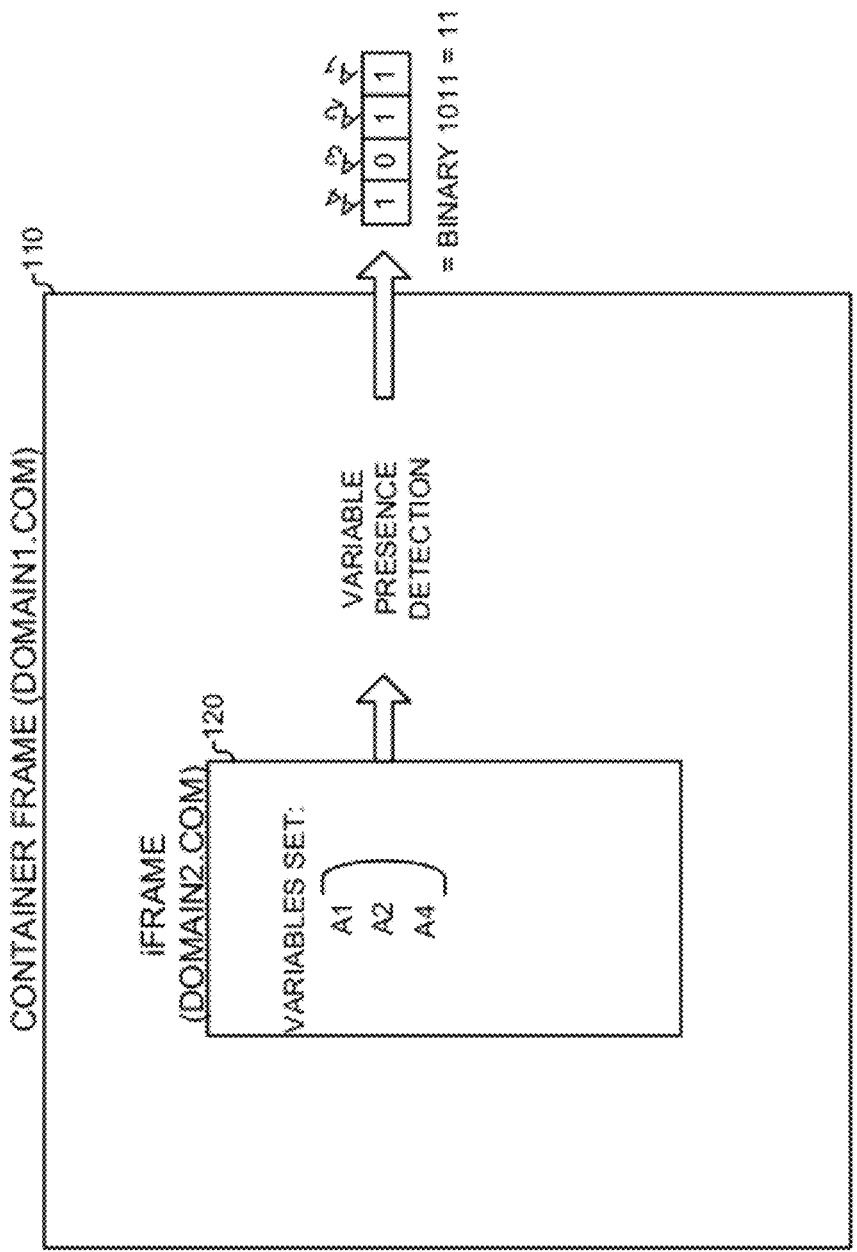
FIG. 1 is a diagram conceptually illustrating an example of communication of information from an iFrame to a container frame.

FIG. 1 is a diagram conceptually illustrating the communication of information from an iFrame to a container frame. As shown, a container frame 110 (e.g., the main frame in the interface presented by a web browser corresponding to a visited web page) may include an iFrame 120. Container frame 110 and iFrame 120 may be associated with different domains or origins. Assume that iFrame 120 is to communicate a four-bit value (11, or, in binary "1011") to container frame 110. IFrame 120 may set a number of variables, where each of the variables has a predetermined name. Due to browser design, container frame 110 may not be able to read the values of the variables, but may be able to determine whether a variable is present (set) or not present (not set or "unset") in iFrame 120. In one implementation, the presence of a variable may be interpreted as a binary one and the absence of a variable may be interpreted as a binary zero.

In the illustrated example, the variables A1, A2, and A4 are set. IFrame 120 may not set a value for the variable A3. Even though container frame 110 may not be able to access the substantive data associated with variables A1, A2, A3, and A4, container frame 110 may be able to determine whether the variables are present (set) in iFrame 120 or not present (unset) in iFrame 120. At some point, container frame 110 may scan for the variables A1, A2, A3, and A4, and determine that each of these variables, except A3, are set. Container frame 110 may interpret these variables as encoding a binary number, such as one in which all set variables are equal to a binary one and unset variables are equal to a binary zero. Thus, container frame 110 may read a value from iFrame 120. Code within container frame 110 may then act on the read value, such as by adjusting the height of iFrame 120, based on the read value.

In one implementation, the variables set in iFrame 120 may be images, such as "hidden" images that have attributes, such as the "name" attribute, set to the variable names. Additionally, in some implementations, scanning each of the variable names in iFrame 120 may take some time. In order to avoid a race condition (i.e., attempting to read the variable names at the same time as the variables are being set/unset by iFrame 120), a "lock" variable may be used to signify that the variable names are locked for editing and should not be read. In this manner, variable values may be transferred across origins in a browser even though the browser may not ordinarily permit cross-origin communication.

System Overview

Figure 2:
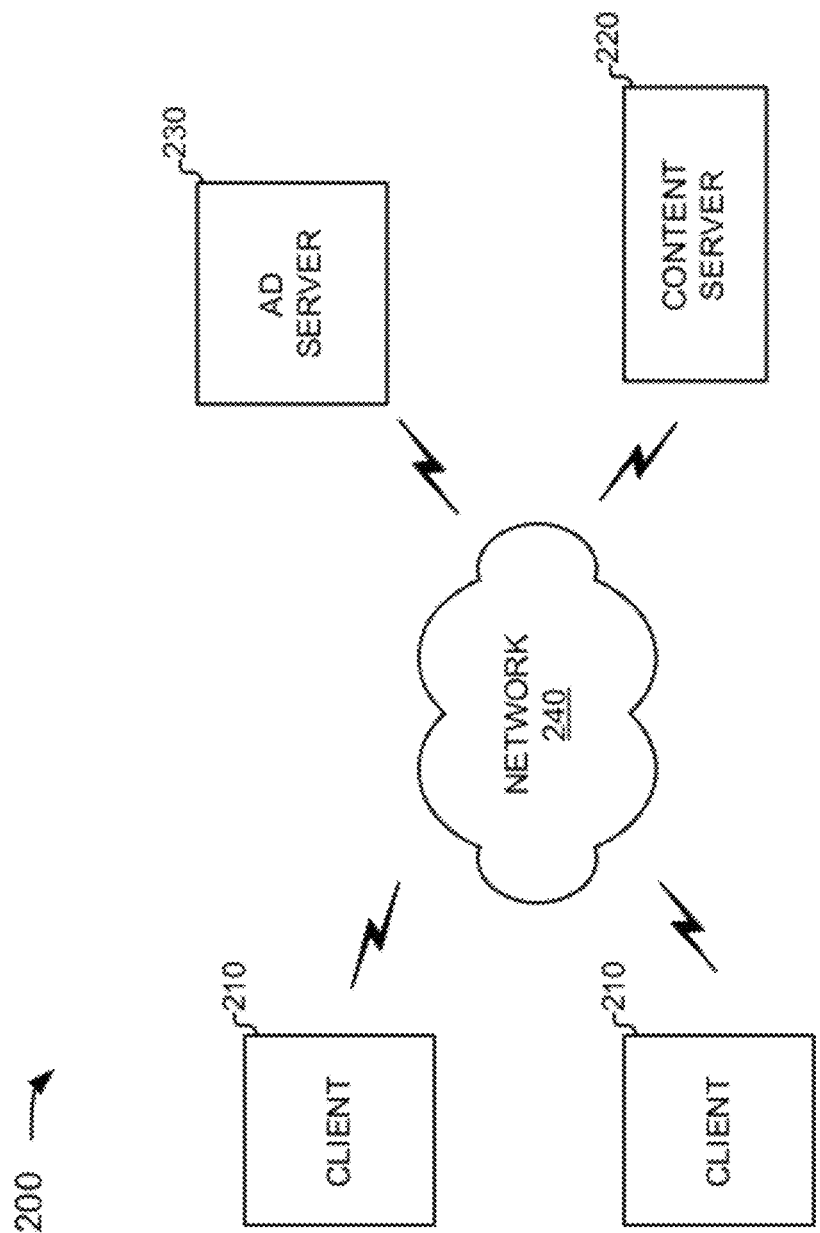
FIG. 2 is a diagram of an example environment in which techniques described herein may be implemented.

FIG. 2 is a diagram of an example environment 200 in which techniques described herein may be implemented. Environment 200 may include multiple clients 210 connected to one or more servers 220-230 via a network 240. Clients 210 and servers 220 and 230 may connect to network 240 via wired, wireless, or a combination of wired and wireless connections.

Two clients 210 and two servers 220-230 are illustrated as connected to network 240 for simplicity. In practice, there may be additional or fewer clients and servers. Also, in some instances, a client may perform one or more functions of a server and a server may perform one or more functions of a client.

Clients 210 may include devices of users that access servers 220-230. A client 210 may include, for instance, a personal computer, a wireless telephone, a personal digital assistant (PDA), a laptop, a smart phone, a tablet computer, or another type of computation or communication device. Servers 220 and 230 may include devices that access, fetch, aggregate, process, search, provide, and/or maintain documents. Although shown as single components 220 and 230 in FIG. 2, each server 220 and 230 may, in some implementations, be implemented as multiple computing devices, which may potentially be geographically distributed.

Server 220 may include one or more computing devices designed to provide content to users of clients 210. Server 220 may, for example, include one or more web servers associated with a particular domain or web site. Users of clients 210 may access server 220 to obtain web pages.

Server 230 may include one or more computing devices designed to provide advertisements to users of clients 210. Server 230 may include, for example, one or more advertisement servers that store advertisements, such as advertisements that are received from customers of the operator of server 230. Web pages downloaded from server 220 may include references to server 230 or to advertisements stored by server 230. As the web pages are being rendered by client 210, the client may request the advertisements from server 230. The advertisements may be displayed within an iFrame included in the web page. In an alternative implementation, server 230 may provide services, for content servers, other than advertisements. For example, server 230 may provide a software widget, such as a small application that content providers can insert into web pages, to clients 210.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Network 240 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks.

Although FIG. 2 shows example components of environment 200, in other implementations, environment 200 may contain fewer components, different components, differently arranged components, and/or additional components than those depicted in FIG. 2. Alternatively, or additionally, one or more components of environment 200 may perform one or more other tasks described as being performed by one or more other components of environment 200.

Figure 3:
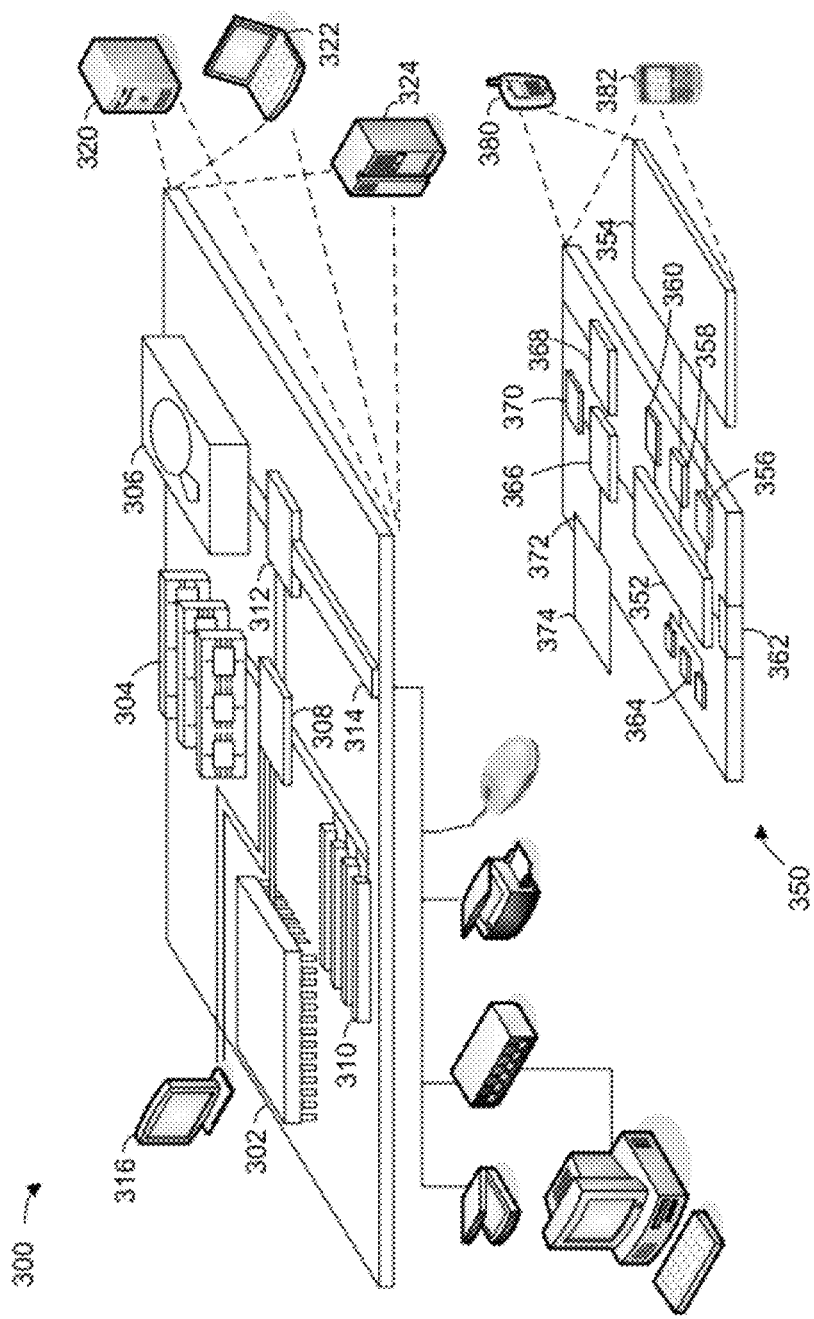
FIG. 3 shows an example of a generic computing device and a generic mobile computing device, which may be used with the techniques described herein.

FIG. 3 shows an example of a generic computing device 300 and a generic mobile computing device 350, which may be used with the techniques described herein. Computing device 300 may correspond to, for example, client 210 and/or server 220/230. For example, each of clients 210 and servers 220/230 may include one or more computing devices 300. Mobile computing device 350 may correspond to, for example, portable implementations of clients 210.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, may be interconnected using various busses, and may be mounted on a common motherboard or in other manners as appropriate. Processor 302 may process instructions for execution within computing device 300, including instructions stored in the memory 304 or on storage device 306 to display graphical information for a graphical user interface (GUI) on an external input/output device, such as display 316 coupled to high speed interface 308. In another implementation, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system, etc.).

Memory 304 may store information within computing device 300. In one implementation, memory 304 may include a volatile memory unit or units. In another implementation, memory 304 may include a non-volatile memory unit or units. Memory 304 may also be another form of computer-readable medium, such as a magnetic or optical disk. A computer-readable medium may be defined as a non-transitory memory device. A memory device may include memory space within a single physical memory device or spread across multiple physical memory devices.

Storage device 306 may provide mass storage for computing device 300. In one implementation, storage device 306 may include a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described below. The information carrier may include a computer or machine-readable medium, such as memory 304, storage device 306, or memory included within processor 302.

High speed controller 308 may manage bandwidth-intensive operations for computing device 300, while low speed controller 312 may manage lower bandwidth-intensive operations. Such allocation of functions is an example only. In one implementation, high-speed controller 308 may be coupled to memory 304, display 316 (e.g., through a graphics processor or accelerator), and to high-speed expansion ports 310, which may accept various expansion cards (not shown). In the implementation, low-speed controller 312 may be coupled to storage device 306 and to low-speed expansion port 314. Low-speed expansion port 314, which may include various communication ports (e.g., USB, Bluetooth™, Ethernet, wireless Ethernet) may be coupled to one or more input/output devices, such as a keyboard, a pointing device, a scanner, or a networking device, such as a switch or router, e.g., through a network adapter.

Computing device 300 may be implemented in a number of different forms, as shown in FIG. 3. For example, it may be implemented as a standard server 320, or multiple times in a group of such servers. It may also be implemented as part of a rack server system 324. Additionally or alternatively, computing device 300 may be implemented in a personal computer, such as a laptop computer 322. Additionally or alternatively, components from computing device 300 may be combined with other components in a mobile device (not shown), such as mobile computing device 350. Each of such devices may contain one or more of computing device 300, mobile computing device 350, and/or an entire system may be made up of multiple computing devices 300 and/or mobile computing devices 350 communicating with each other.

Mobile computing device 350 may include a processor 352, a memory 364, an input/output (I/O) device such as a display 354, a communication interface 366, and a transceiver 368, among other components. Mobile computing device 350 may also be provided with a storage device, such as a microdrive or other device (not shown), to provide additional storage. Each of components 350, 352, 364, 354, 366, and 368, may be interconnected using various buses, and several of the components may be mounted on a common motherboard or in other manners as appropriate.

Processor 352 may execute instructions within mobile computing device 350, including instructions stored in memory 364. Processor 352 may be implemented as a set of chips that may include separate and multiple analog and/or digital processors. Processor 352 may provide, for example, for coordination of the other components of mobile computing device 350, such as, for example, control of user interfaces, applications run by mobile computing device 350, and/or wireless communication by mobile computing device 350.

Processor 352 may communicate with a user through control interface 358 and a display interface 356 coupled to a display 354. Display 354 may include, for example, a TFT LCD (Thin-Film-Transistor Liquid Crystal Display), an OLED (Organic Light Emitting Diode) display, and/or other appropriate display technology. Display interface 356 may comprise appropriate circuitry for driving display 354 to present graphical and other information to a user. Control interface 358 may receive commands from a user and convert them for submission to processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 may store information within mobile computing device 350. Memory 364 can be implemented as one or more of a computer-readable medium or media, a volatile memory unit or units, or a non-volatile memory unit or units. Expansion memory 374 may also be provided and connected to mobile communication device 350 through expansion interface 372, which may include, for example, a SIMM (Single In Line Memory Module) card interface. Such expansion memory 374 may provide extra storage space for mobile computing device 350, or may also store applications or other information for mobile computing device 350. Specifically, expansion memory 374 may include instructions to carry out or supplement the processes described above, and may also include secure information. Thus, for example, expansion memory 374 may be provided as a security module for mobile computing device 350, and may be programmed with instructions that permit secure use of mobile computing device 350. In addition, secure applications may be provided via SIMM cards, along with additional information, such as placing identifying information on a SIMM card in a non-hackable manner.

Memory 364 and/or expansion memory 374 may include, for example, flash memory and/or NVRAM memory, as discussed below. In one implementation, a computer program product may be tangibly embodied in an information carrier. The computer program product may store instructions that, when executed, perform one or more methods, such as those described above. The information carrier may correspond to a computer- or machine-readable medium, such as the memory 364, expansion memory 374, or memory included within processor 352, that may be received, for example, over transceiver 368 or over external interface 362.

Mobile computing device 350 may communicate wirelessly through a communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, a Global Positioning System (GPS) receiver module 370 may provide additional navigation- and location-related wireless data to mobile computing device 350, which may be used as appropriate by applications running on mobile computing device 350.

Mobile computing device 350 may also communicate audibly using an audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in FIG. 3. For example, it may be implemented as a cellular telephone 380. It may also be implemented as part of a smart phone 382, a personal digital assistant (not shown), and/or other similar mobile device.

Various implementations of the systems and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. As used herein, the terms "machine-readable medium" and "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described herein may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

Although FIG. 3 shows example components of computing device 300 and mobile computing device 350, computing device 300 or mobile computing device 350 may include fewer components, different components, additional components, or differently arranged components than depicted in FIG. 3. Additionally or alternatively, one or more components of computing device 300 or mobile computing device 350 may perform one or more tasks described as being performed by one or more other components of computing device 300 or mobile computing device 350.

Cross-Origin Communication

Figure 4:
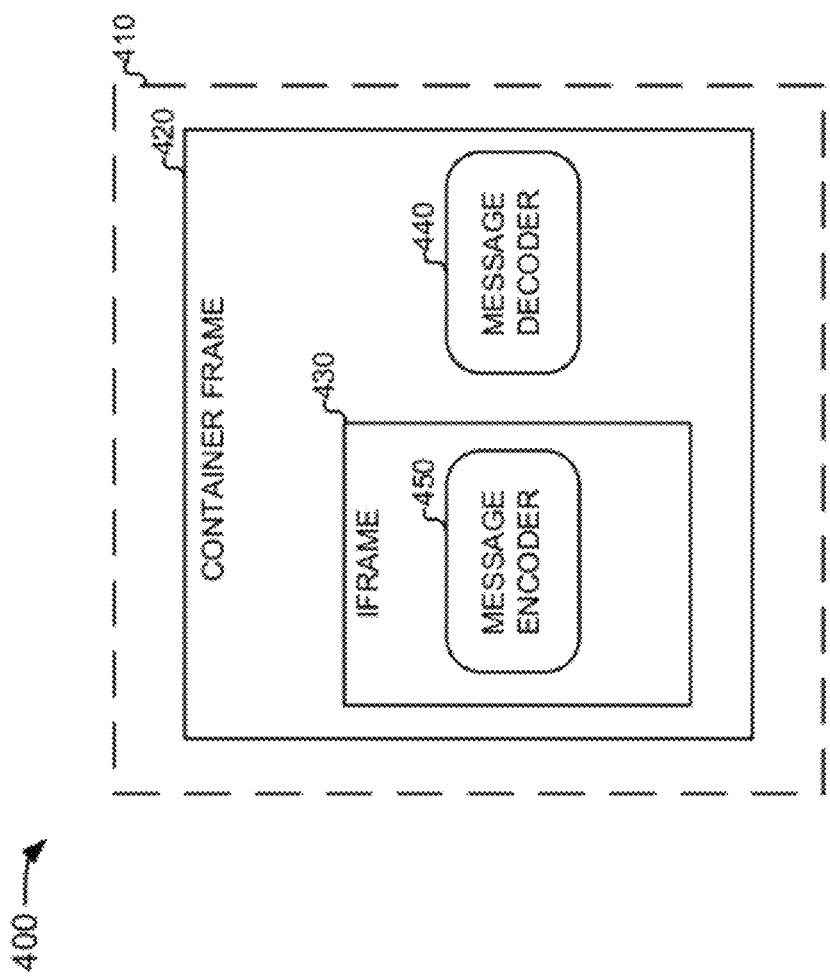
FIG. 4 is a diagram of example functional components relating to cross-origin communication between frames in a browser.

FIG. 4 is a diagram of example functional components 400 relating to cross-origin communication between frames in a browser. Functional components 400 may be implemented, for example, using a scripting language, such as JavaScript, incorporated as part of a web page delivered to a browser program 410 that is running at a client 210. In one implementation, browser program 410 may include a browser that does not implement an explicit interface for communicating between cross-origin frames but that nevertheless allows, either intentionally or unintentionally, information to be communicated between cross-origin frames, such as information relating to whether a particular variable is set or unset. The web page may include a number of elements, such as HTML elements, that may include a container frame 420 and an iFrame 430. Container frame 420 and iFrame 430 may be associated with different domains or origins. Because of this, browser program 410 may not permit direct communication between container frame 420 and iFrame 430.

As used herein, a "domain" may refer to a realm of administrative autonomy, authority, or control associated with the Internet. A domain may, for example, correspond to a web site. Two different frames associated with different domains may refer to frames in a web browser that are associated with content retrieved, by the browser, from different domains. The term "origin," as used herein the in the context of browser cross-origin communication, may include cross-domain communication as well as intra-domain communication in which different protocols or ports are used. For example, cross-origin communication can occur in the same domain if different protocols are used, such as an encrypted iFrame communicating with an unencrypted parent frame. As another example, frames associated with different ports (e.g., a frame associated with www.example.com:80 and a second frame associated with www.example.com:8080) may not normally be able to communicate without using the cross-domain/cross-origin techniques described herein.

In alternative possible implementations, iFrame 430 may be replaced with another element, such as a different type of frame, through which communication between the container frame and the different type of frame are not directly permitted by browser program 410. In another alternative possible implementation, container frame 420 and iFrame 430, instead of being in a parent/child relationship, may be, for example, sibling frames in a browser window or frames in different browser windows.

Container frame may include message decoder 440 and iFrame 430 may include message encoder 450. Message encoder 450 may encode one or more messages or values using a number of predefined variable names. The "predefined" variable names may be any names that are previously agreed upon or shared between container frame 420 and iFrame 430. The messages or values may be, for example, a single integer value that iFrame 430 uses to convey information about the state or content of iFrame 430. More generally, the messages/values may include a number of values or a data structure. As one example of a value that iFrame 430 may communicate to container frame 420, consider the situation in which iFrame 430 receives additional content that will require more space to display. In this situation, it may be desirable for iFrame 430 to transmit a value, updating the height of iFrame 430, to container frame 420.

Message decoder 440 may operate to decode the messages encoded by message encoder 450. Message decoder 440 may, for example, periodically poll iFrame 430 to determine whether the variables having the predefined names are set or not set in iFrame 430. The set/not set state of the predefined variable names may be interpreted as binary values that can be used to reconstruct a digital value or message. The operation of message decoder 440 and message encoder 450 will be described in more detail below.

Although FIG. 4 shows example functional components 400 relating to cross-origin communication, in other implementations, functional components 400 may contain fewer components, different components, differently arranged components, and/or additional components than those depicted in FIG. 4. Alternatively, or additionally, one or more of the functional components shown in FIG. 4 may perform one or more other tasks described as being performed by one or more other components of FIG. 4.

Figure 5:
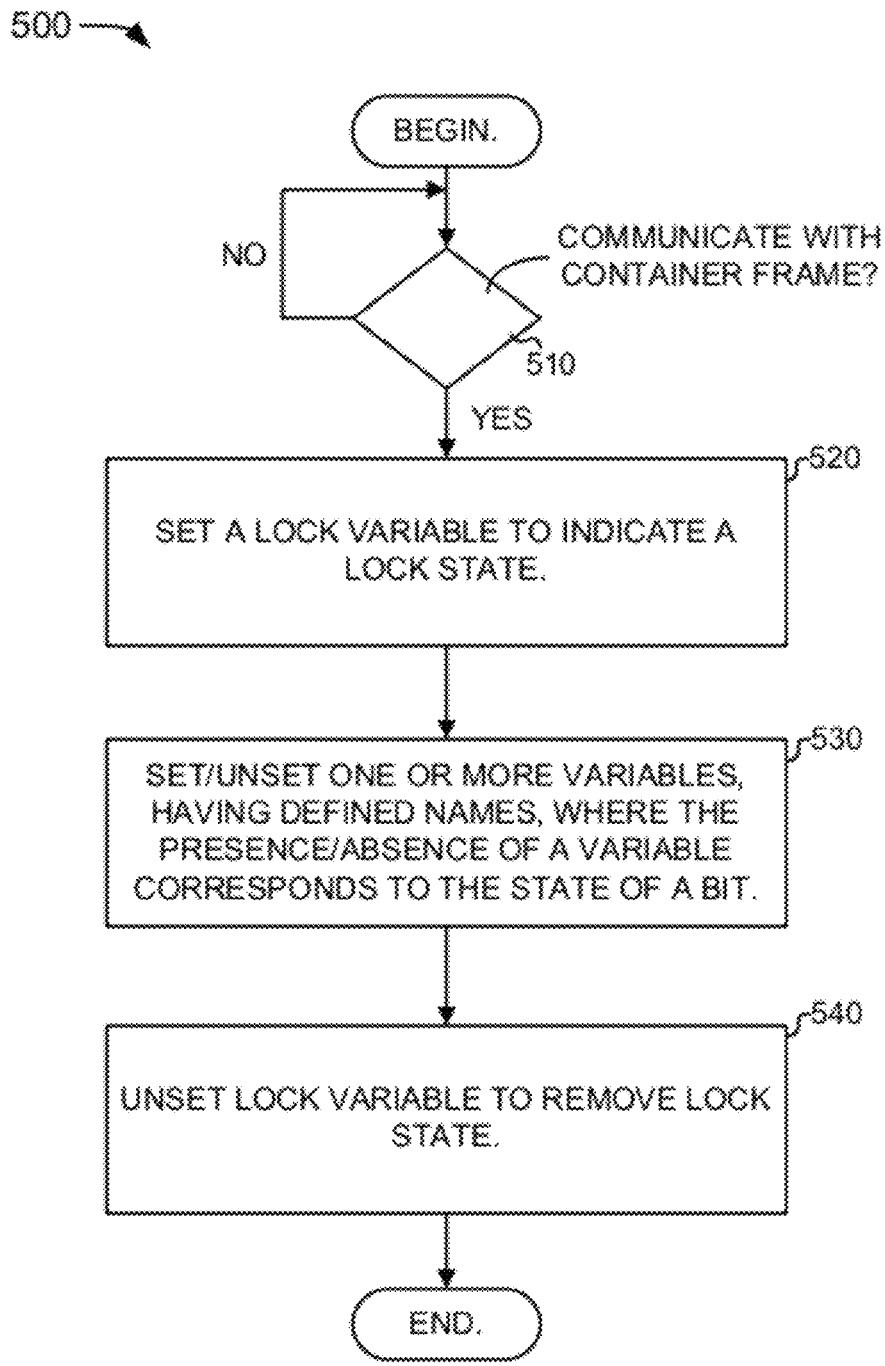
FIG. 5 is a flow chart of an example process for performing cross-origin communication between frames presented by a browser.

FIG. 5 is a flow chart of an example process 500 for performing cross-origin communication between frames presented by a browser. Process 500 may be performed by, for example, programming instructions, such as JavaScript programming instructions, executed by a client 210 as part of a received web page. In one implementation, process 500 may be performed by iFrame 430 of client 210. iFrame 430 may be received by client 210 from a server, such as advertisement server 230, after begin generated and transmitted by the advertisement server.

Process 500 may include determining whether to communicate with the container frame (block 510). IFrame 430 may, for instance, at certain points in time, have information that is to be communicated to container frame 420. For example, iFrame 430 may be a frame that receives and displays advertisements from an advertisement server. The quantity of advertisements that are received may vary, which may cause the needed height of iFrame 430 to vary. For example, an increase in a quantity of advertisements may require an increase in the height of iFrame 430. IFrame 430 may thus update container frame 420 when the height of iFrame 430 changes. In other implementations, iFrame 430 may communicate other information to container frame 420, such as the width of iFrame 430, other state information, information on user behavior in interacting with iFrame 430, etc.

Process 500 may further include, when it is determined to communicate with container frame 420 (block 510—YES), setting a first variable to indicate a lock state. For example, message encoder 450 may set a variable (i.e., declare or substantiate the variable). The variable may be an HTML element that is named using a name that is predetermined so that both message encoder 450 and message decoder 440 are aware of the variable name. In one implementation, the variable may be set by declaring an HTML image tag in which the "name" attribute (and potentially also the 'id' attribute) is set to the variable name. As an example, the lock state may be set using the variable "iFrameALock" by the HTML tag: <img src='image.jpg' id='iFrameALock' name='iFrameALock'>, <img src='image.jpg' name='iFrameALock'>, or <img name='iFrameALock'>. In other implementations, other variables or HTML elements may be used instead of an HTML tag, such as the <input> and/or the <iframe> elements. In general, any global operator that can be seen by both container frame 420 and iFrame 430 may be used. Relative to some HTML elements, however, the HTML image tag may be amenable to dynamic updating.

Process 500 may further include setting/unsetting one or more other variables (block 530). The variables may have predefined names and the presence/absence of each of the other variables may indicate the state of a single bit of the message that is to be communicated (block 530). In one implementation, the message may be a single integer value (e.g., a four or eight bit value) that is set by message encoder 450.

As an example of the setting/unsetting of one or more variables, as performed in block 530, consider the situation, shown in FIG. 1, in which a four-bit value is to be communicated from iFrame 430 to container frame 420. In this example, the four predetermined variable names are: A1 (the first bit in the value), A2 (the second bit in the value), A3 (the third bit in the value), and A4 (the fourth bit in the value). Message encoder 450 may set (i.e., declare or instantiate) each of these variables that correspond to a "one" bit and unset (delete or not declare) each of these variables that correspond to a "zero" bit. As shown in FIG. 1, for the four bit binary value "1011" (i.e., 11), the variables A1, A2, and A4 may be set and variable A3 may be unset. In this manner, an arbitrary length message, value, or values may be communicated to container frame 420.

As used herein, a "set" variable refers to a variable that is declared or instantiated by programming code in a frame. An "unset" variable, in contrast, may refer to a variable that has not been declared/instantiated or that was declared/instantiated but was later deleted.

As with the lock state variable, the one or more variables that are set/unset in block 530 may include any global operator that can be seen by both container frame 420 and iFrame

430. In one implementation, the variable may be an HTML image element in which the "name" attribute is set as the variable name.

Process 500 may further include unsetting the lock variable to remove the lock state (block 540). Unsetting the lock variable may include deleting or removing the reference to the variable. For the situation in which a variable name is set by adding an image, having a particular name attribute, unsetting the variable may correspond to deleting the image from the web page. By using the lock variable, race conditions in which message decoder 440 attempts to read a variable that is being written by message encoder 450, may be avoided.

Figure 6:
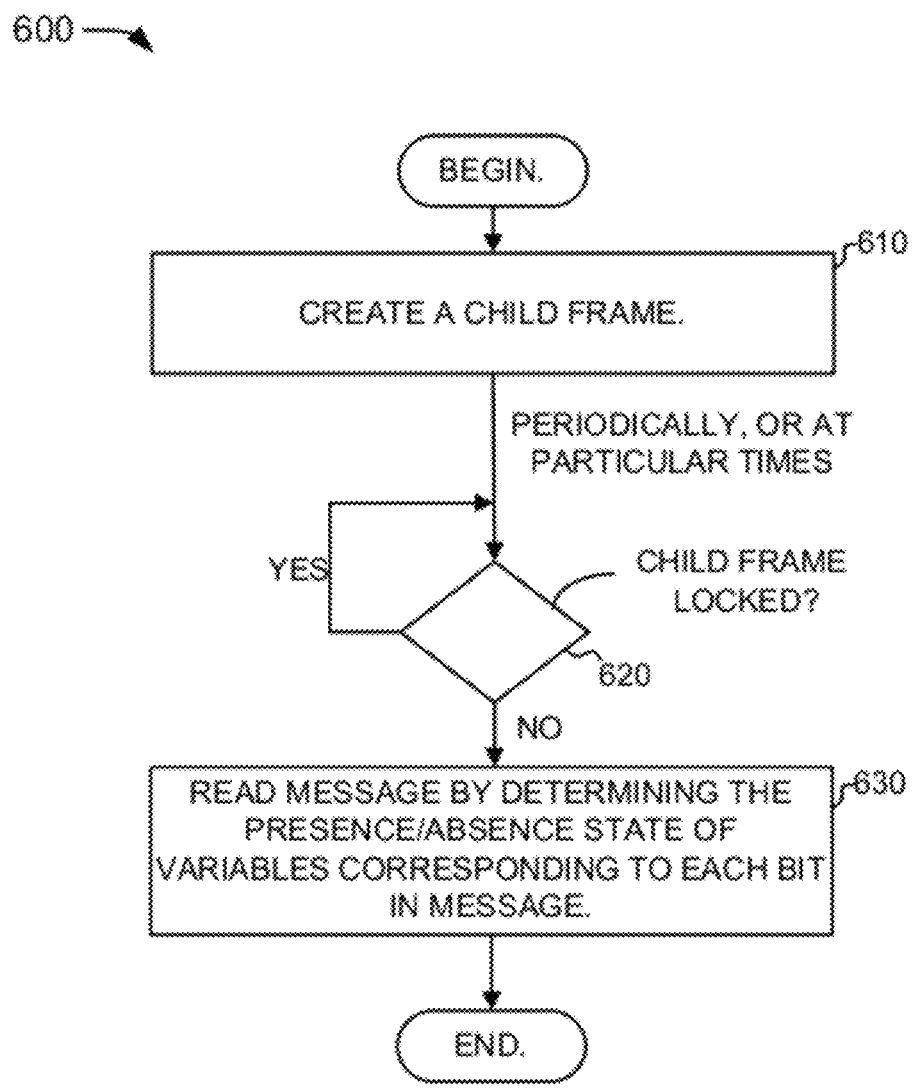
FIG. 6 is a flow chart of another example process for performing cross-origin communication between frames presented by a browser.

FIG. 6 is a flow chart of another example process 600 for performing cross-origin communication between frames presented by a browser. Process 600 may be performed by, for example, programming instructions, such as JavaScript programming instructions, executed by a client 210 as part of a received web page. In one implementation, process 500 may be performed by container frame 420 and/or browser 410.

Process 600 may include creating a child frame (block 610). In one implementation, the child frame may correspond to iFrame 430. As an example of the creation of the child frame, a web page may be received from content server 220. The web page may include an iFrame tag. The iFrame tag may include a link to another document or web site. The iFrame tag may include a "src" attribute that references the web page that is to be included in the iFrame. In one implementation, the src attribute may reference advertisement server 230. The child frame may be associated with a different domain or origin then the container frame (e.g., the container frame may receive content from content server 220 and the child frame may receive advertisements from advertisement server 230).

Periodically, or at particular times, it may be determined whether the child frame is locked (block 620). For example, message decoder 440 may determine whether the lock variable (i.e., the lock variable set in block 520, FIG. 5) is present or absent. In one implementation, message decoder 440 may use the command 'iFrameALock in iframe.contentWindow' to determine whether a variable is present, where iFrameALock refers to the name of the lock variable and iframe.contentWindow refers to the child frame.

When the child frame is locked (block 620—YES), no additional action may be taken with respect to reading the message. When, however, the child frame is not locked (block 620—NO), the message may be read by determining the presence/absence state of the variables corresponding to each bit in the message (block 630). Message decoder 440 may, for example, iterate through each variable name that is predefined for the message (e.g., using the command 'variableN in iframe.contentWindow,' where variableN refers to the name of a variable and iframe.contentWindow refers to the child frame) to determine whether the variable is present (which may correspond to a binary one) or absent (which may correspond to a binary zero). The variables may each correspond to a predetermined bit position in the read message/value, and may thus be used to reconstruct the message/value that was encoded by the child frame.

As an example of the operation of block 630, consider a four-bit value that is to be read by container frame 420 and in which the four corresponding variables are named A1, A2, A3, and A4. Further, assume iFrame 420 is named "iFrame1." To obtain the state of each of the four bits, message decoder 440 may perform the operations: "A1 in iFrame1," "A2 in iFrame1," "A3 in iFrame1," and "A4 in iFrame1." In this manner, and as discussed with respect to FIG. 1, the four-bit binary value "1011" can be decoded by interpreting the set variables corresponding to the first, second, and fourth bit positions as ones (i.e., "A1 in iFrame1" is true, "A2 in iFrame1" is true, and "A4 in iFrame1" is true) and the unset variable corresponding to the third bit position as a zero (i.e., "A3 in iFrame1" is false).

In the description above, the interpretation of whether a present/absent variable is interpreted as a zero bit or one bit may be arbitrary. In some implementations, the presence of a variable may be interpreted as a binary zero and the absence of the variable may be interpreted as a binary one.

Further, although the above description was given with respect to iFrame 430 providing a message to container frame 420, in other possible implementations, the described technique could be reversed so that container frame 420 provides messages to iFrame 430.

In one implementation, blocks 620 and 630 may be periodically performed by container frame 420. Accordingly, container frame 420 may continuously (e.g., every few seconds) read the message and perform an action when the message changes.

Still further, although a container frame 420, including a single iFrame 430, was discussed above, in some implementations, multiple iFrames 430 may be present in container frame 420. In this case, each iFrame 430 may be given a unique name. Each iFrame 430 may then separately transmit information to container frame 420 or a single coordinating iFrame 430 may transmit information for each of iFrames 430. For example, assume a number of iFrames 430, each associated with the same domain, are each to transmit a height value to container frame 420. A coordinating one of the iFrames 430 may receive height information, from the domain, for each of iFrames 430. The coordinating iFrame 430 may then set variable names for each of the iFrames 430. The variable names may include the names of each of iFrames 430. For example, assume that there are three iFrames, named frame1, frame2, and frame3, and each iFrame is associated with a four-bit value, where the bits are named A1, A2, A3, and A4. In this case, the coordinating iFrame may set/unset the following variable names: frame1A1, frame1A2, frame1A3, frame1A4, frame2A1, frame2A2, frame2A3, frame2A4, frame3A1, frame3A2, frame3A3, and frame3A4.

As previously mentioned, information other than the size of a frame may be communicated using the techniques discussed herein. For example, if a number of iFrames are contained in a parent frame, it may be useful to communicate, to the parent frame, the last iFrame that was updated. For example, if there are three advertisement blocks (e.g., iFrames) in a container frame, it may be useful for the coordinating iFrame to communicate the iFrame that most recently downloaded an advertisement. Thus, in this example, the number three may be communicated, indicating that the third iFrame was the last to receive an advertisement.

In the above discussion, global variables, such as named images, were used to pass messages between frames. In other implementations, other techniques for exchanging information between frames may be used. One such alternative technique may be based on a globally detectable state change due to the visiting of links. This technique will next be discussed with reference to FIG. 7.

Figure 7:
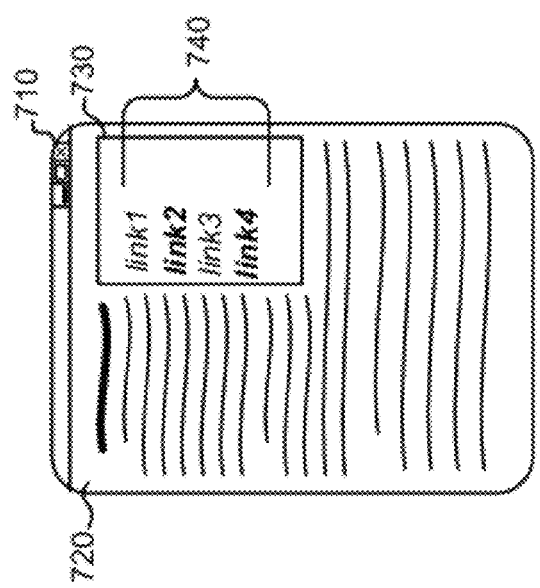
FIG. 7 is a diagram conceptually illustrating an example of using link visits to exchange information between frames presented by a browser.

FIG. 7 is a diagram conceptually illustrating an example of the visiting of links to exchange information between browser frames. In FIG. 7, a web browser 710 may display a web page that includes a frame 720. Frame 720 may include a child frame 730 (e.g., an iFrame). Frame 720 and child frame 730 may be associated with different domains. Child frame 730 may transmit information to frame 720 by visiting one or more links in child frame 730.

Four example links 740 are shown in child frame 730, labeled as link1, link2, link3, and link4. Each of links 740 may be generated in an iFrame created by child frame 730. Each of links 740 may be a link to a unique uniform resource locator (URL) at the domain associated with child frame 730. As an example, assume that link1, link2, link3, and link4 correspond to URLs such as:

somedomain/someuniquepath/0
somedomain/someuniquepath/1
somedomain/someuniquepath/2
somedomain/someuniquepath/3

Each of links 740 may be used to transmit one bit of information to frame 720. Thus, if the binary value "1010" is to be transmitted, child frame 730 may visit link2 and link4, but not visit link1 and link3. The act of visiting a link may cause web browser 710 to alter globally accessible state information relating to this link. For instance, the font of a visited link may be distinguished from the font of a non-visited link, such as by using different colors to represent visited/non-visited links. In FIG. 7, the visited links (link2 and link4) are illustratively shown in bold font. Frame 720 may detect the different colors/font of the links to obtain a binary value corresponding to each link. In this manner, a value can be encoded by child frame 740 and transmitted to frame 720 in a manner similar to the way variables were set/unset in flow charts of FIGS. 5 and 6.

Figure 8A:
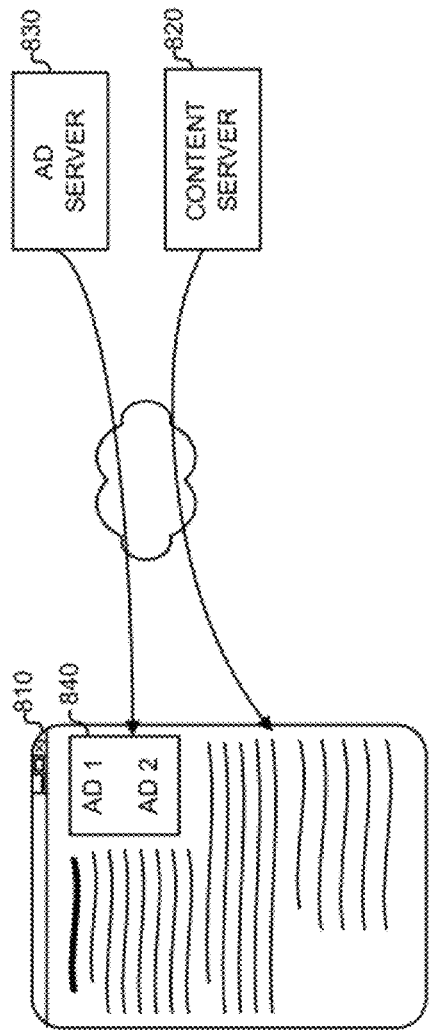
FIGS. 8A and 8B are diagrams illustrating an example application of the techniques discussed herein.
Figure 8B:
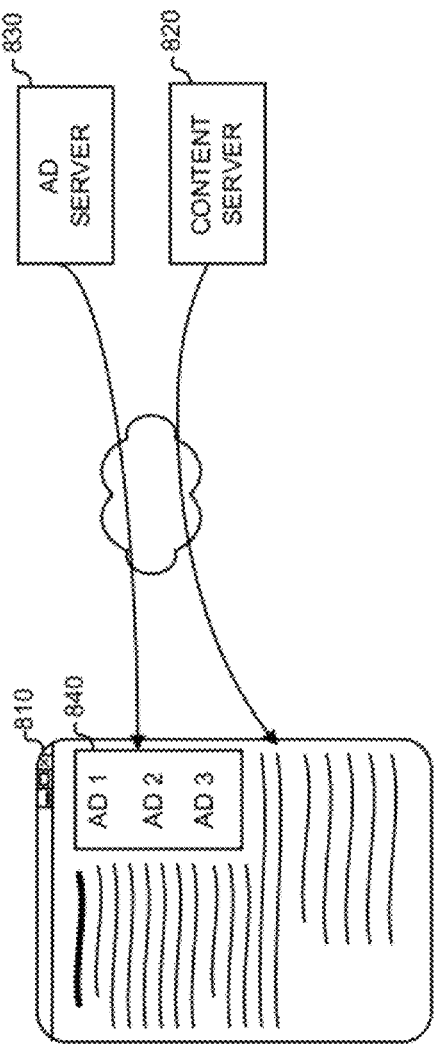

FIGS. 8A and 8B are diagrams illustrating an example application of the techniques discussed above. In FIG. 8A, a web browser 810 may receive content from a content server 820. The content may include an iFrame tag that refers to an advertisement (AD) server 830. The iFrame tag, when rendered by browser 810, may create an iFrame 840. IFrame 840 may receive and present advertisements (e.g., ADs 1 and 2), such as textual advertisements, received from advertisement server 830.

Initially, as shown in FIG. 8A, iFrame 840 may receive two advertisements from advertisement server 830. At some point, however, as shown in FIG. 8B, iFrame 840 may receive another advertisement (e.g., AD 3) or another set of advertisements (e.g., ADs 1-3). Due to the extra advertisement, iFrame 840 may require more space to appropriately display the advertisements. In particular, the height of iFrame 840 may need to be increased to accommodate the additional advertisement. IFrame 840, using the techniques discussed above, may communicate the new height (or the new number of advertisements that are to be displayed), to frame 810, which may correspondingly adjust the formatting of the web page to account for the additional height.

The foregoing description provides illustration and description, but is not intended to be exhaustive or to limit the embodiments to the precise form disclosed. Modifications and variations are possible in light of the above teachings or may be acquired from practice of these embodiments.

For example, while a series of blocks have been described with regard to FIGS. 5 and 6, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementation includes each dependent claim in combination with every other claim in the claim set.

No element, act, or instruction used in the present application should be construed as critical or essential to the disclosed embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium, containing instructions for execution by a browser program executed by one or more devices, the non-transitory computer-readable medium comprising instructions to:
   create an inline frame (iFrame) and another frame presented by the browser program, the iFrame being associated with an origin that is different than an origin associated with the other frame;
   determine whether a first variable is present in the iFrame;
   determine whether the iFrame is locked, to prohibit reading of information relating to the iFrame, based on determining whether the first variable is present in the iFrame;
   determine, when the iFrame is not locked, a set of second variables present in the iFrame,
   determine one or more binary values based on the set of second variables,
      where each of the one or more binary values comprises a plurality of bits,
      where each bit of the plurality of bits corresponds to a presence or an absence of a corresponding variable of the set of second variables; and
   control, based on the one or more binary values, a visual presentation of the other frame presented by the browser program.

2. The non-transitory computer-readable medium of claim 1, where the first variable and the set of second variables correspond to hyper-text markup language (HTML) image tags within the iFrame.

3. The non-transitory computer-readable medium of claim 2, where the first variable and the set of second variables are assigned predetermined names through name attributes of the HTML image tags.

4. The non-transitory computer-readable medium of claim 1, where the origin, associated with the content of the iFrame, is associated with one or more servers that provide advertisements for display by the browser program.

5. The non-transitory computer-readable medium of claim 1, where the one or more binary values relate to a height of the iFrame.

6. The non-transitory computer-readable medium of claim 1, further comprising instructions to:
when the iFrame is locked, periodically repeat the determination of whether the iFrame is locked until the iFrame is not locked.

7. The non-transitory computer-readable medium of claim 1, where the first variable and the set of second variables correspond to links within the iFrame.

8. The non-transitory computer-readable medium of claim 1, where the other frame is a container frame or a sibling frame of the iFrame.

9. A device-implemented method comprising:
determining, by a device executing a first frame of a browser program, to communicate at least one binary value to a second frame, of the browser program being executed by the device,
where the first frame includes content associated with a first origin and the second frame includes content associated with a second origin, and
where each of the at least one binary value comprises a plurality of bits;
setting, by the device, a first variable to indicate that the at least one binary value is being set by the first frame;
setting or unsetting, by the device, a set of second variables to encode the at least one binary value,
where each variable, in the set of second variables, corresponds to a single bit of the plurality of bits of the at least one binary value,
where a presence of a variable in the set of second variables encodes the single bit corresponding to the variable as a first binary digit,
where an absence of the variable in the set of second variables encodes the single bit corresponding to the variable as a second binary digit, and
where the first binary digit does not equal the second binary digit; and
unsetting, after setting or unsetting each the second set of variables, by the device, the first variable, to permit the one or more binary values to be communicated to the second frame.

10. The method of claim 9, where the first frame includes an inline frame (iFrame) and the second frame contains the iFrame or is a sibling frame to the iFrame.

11. The method of claim 9, where setting or unsetting the set of second variables includes:
instantiating images in the first frame to set the set of second variables, and
deleting the images in the first frame to unset the set of second variables.

12. The method of claim 9, where the first variable and the set of second variables correspond to hyper-text markup language (HTML) image tags within the first frame.

13. The method of claim 9, where the at least one binary value relates to a size of the first frame.

14. The method of claim 9, where the first variable and the set of second variables correspond to links within the first frame.

15. The method of claim 14, where setting the first variable or the set of second variables includes visiting of links within the first frame.

16. A device-implemented method comprising:
receiving, by the device and from a client device, a request for a hyper-text markup language (HTML) document;
generating the HTML document to include programming instructions, that when executed by the client device, cause the client device to:
set a first variable to indicate that at least one binary value is being set by a frame corresponding to the HTML document,
where each one of the at least one binary value comprise a plurality of single bits,
set or unset each variable, of a set of second variables, to encode the at least one binary value,
where each variable, in the set of second variables, corresponds to a single bit of the plurality of single bits,
where a presence of a variable in the set of second variables encodes the single bit corresponding to the variable as a first binary digit, and
where an absence of the variable in the set of second variables encodes the single bit corresponding to the variable as a second binary digit that is different from the first binary digit, and
unset, after setting or unsetting the set of second variables, the first variable; and
transmitting the generated HTML document to the client device.

17. The method of claim 16, where the device includes an advertisement server.

18. The method of claim 16, where the first variable and the set of second variables correspond to hyper-text markup language (HTML) image tags.

19. The method of claim 16, where the at least one binary value relates to a size of the frame.

20. The method of claim 16, where the first variable and the set of second variables correspond to links within the frame.

21. An apparatus comprising:
one or more processors; and
a memory storing programming instructions for execution by the one or more processors, the programming instructions, when executed, causing the one or more processors to:
create an inline frame (iFrame) within a second frame presented by a browser program for display, the iFrame being associated with an origin that is different than an origin associated with the second frame,
where the iFrame communicates at least one binary value to the second frame, and
where each one of the at least one binary value comprises a plurality of single bits;
set or unset, by the iFrame, a set of variables to encode the at least one binary value,
where each variable, in the set of variables, corresponds to a single bit of the plurality of single bits of the at least one binary value, and
where a presence of a variable, in the set of variables, encodes the single bit corresponding to the variable as a first binary digit and an absence of the variable, in the set of variables, encodes the single bit corresponding to the variable as a second binary digit that is different from the first binary digit; and
determine, by the second frame, the at least one binary value communicated by the iFrame,
where the at least one binary value is determined by checking whether each variable, of the set of variables, is present or absent in the iFrame; and
control, based on the at least one binary value, a visual presentation of the second frame.

22. The apparatus of claim 21, where the programming instructions, when executed by the processor, cause the processor further to:
set, by the iFrame, a lock variable, before setting or unsetting the set of variables; and unset, by the iFrame, the lock variable, after setting or unsetting the set of variables.

23. The apparatus of claim 22, where the programming instructions, when executed by the processor, cause the processor further to:

perform the determination, by the second frame, of the at least one binary value, only when the lock variable is absent in the iFrame.

24. The apparatus of claim 21, where the set of variables correspond to hyper-text markup language (HTML) image tags within the iFrame.

25. The apparatus of claim 21, where the origin associated with the iFrame is associated with one or more servers that provide advertisements for presentation by the browser program for display.

26. The apparatus of claim 21, where the at least one binary value relates to a size of the iFrame.

27. The apparatus of claim 21, where the set of variables correspond to links within the iFrame.

28. The apparatus of claim 21, where the second frame is a container frame or sibling frame of the iFrame.

* * * * *